(12) United States Patent
Birdi et al.

(10) Patent No.: US 7,439,646 B2
(45) Date of Patent: Oct. 21, 2008

(54) HIGH POWER GENERATOR WITH ENHANCED STATOR HEAT REMOVAL

(75) Inventors: Balwinder S. Birdi, Tucson, AZ (US); William M. Scherzinger, Tucson, AZ (US); Mingzhou Xu, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 439 days.

(21) Appl. No.: 11/359,116

(22) Filed: Feb. 21, 2006

(65) Prior Publication Data
US 2007/0194639 A1 Aug. 23, 2007

(51) Int. Cl.
*H02K 1/06* (2006.01)
(52) U.S. Cl. ............................. 310/217; 310/54; 310/65
(58) Field of Classification Search ............. 310/217, 310/61, 54, 58–59, 64–65, 216
See application file for complete search history.

(56) References Cited

U.S. PATENT DOCUMENTS

| | | | |
|---|---|---|---|
| 1,578,509 A | 3/1926 | Gilman et al. | |
| 1,594,058 A | 7/1926 | Freiburghouse | |
| 1,761,587 A | 6/1930 | Ringland | |
| 2,285,960 A | 6/1942 | Fechheimer | |
| 3,805,547 A | 4/1974 | Eber | |
| 3,916,235 A * | 10/1975 | Massar | 310/219 |
| 3,963,950 A | 6/1976 | Watanabe et al. | |
| 4,514,652 A | 4/1985 | Olson | |
| 5,682,074 A * | 10/1997 | Di Pietro et al. | 310/215 |
| 5,710,471 A | 1/1998 | Syverson et al. | |
| 5,883,448 A * | 3/1999 | Zimmerman | 310/52 |
| 6,091,168 A * | 7/2000 | Halsey et al. | 310/61 |
| 6,359,350 B1 * | 3/2002 | Kaiho et al. | 310/52 |
| 6,710,479 B2 | 3/2004 | Yoshida et al. | |
| 6,798,097 B2 | 9/2004 | Pullen et al. | |
| 6,943,469 B2 * | 9/2005 | Nelson | 310/55 |

* cited by examiner

*Primary Examiner*—Michael C Zarroli
(74) *Attorney, Agent, or Firm*—Oral Caglar, Esq.

(57) ABSTRACT

A high speed, high power generator has its main stator configured with one or more reduced-diameter sections. The generator includes a generator housing, a main rotor, and a main stator. The generator housing has a main stator cooling flow passage formed therein that is configured to receive a flow of a cooling medium. The main rotor is rotationally mounted in the generator housing. The main stator is mounted within the generator housing and surrounds at least a portion of the main rotor. The main stator includes a stator core coupled to the generator housing adjacent the main stator cooling flow passage, and includes two or more nominal-diameter sections and one or more reduced-diameter sections. The nominal-diameter sections each have a first outer diameter, and the reduced-diameter sections, each have a second outer diameter that is less than the first diameter. Each reduced-diameter section is disposed between two nominal-diameter sections and is in fluid communication with the stator cooling flow passage.

15 Claims, 4 Drawing Sheets

HIGH POWER GENERATOR WITH ENHANCED STATOR HEAT REMOVAL

TECHNICAL FIELD

The present invention relates to relatively high power generators and, more particularly, to high power generators that are used with gas turbine engines such as those used in aircraft, tanks, ships, terrestrial vehicles, or other applications.

BACKGROUND

Many vehicles, including aircraft, ships, and some terrestrial vehicles, include AC generator systems to supply relatively constant frequency AC power. Many of the AC generator systems installed in these vehicles include three separate brushless generators, namely, a permanent magnet generator (PMG), an exciter, and a main generator. The PMG includes a rotor having permanent magnets mounted thereon, and a stator having a plurality of windings. When the PMG rotor rotates, the permanent magnets induce AC currents in PMG stator windings. These AC currents are typically fed to a regulator or a control device, which in turn outputs a DC current to the exciter.

The exciter typically includes single-phase (e.g., DC) stator windings and multi-phase (e.g., three-phase) rotor windings. The DC current from the regulator or control device is supplied to exciter stator windings, and as the exciter rotor rotates, three phases of AC current are typically induced in the rotor windings. Rectifier circuits that rotate with the exciter rotor rectify this three-phase AC current, and the resulting DC currents are provided to the main generator. The main generator additionally includes a rotor and a stator having single-phase (e.g., DC) and multi-phase (e.g., three-phase) windings, respectively. The DC currents from the rectifier circuits are supplied to the rotor windings. Thus, as the main generator rotor rotates, three phases of AC current are induced in main generator stator windings. This three-phase AC current can then be provided to a load such as, for example, electrical aircraft systems.

In recent years, vehicles are being designed that rely more and more on electrical power. Thus, there is an ever-increasing demand for enhanced electrical generators, such as the one described above. One way of meeting these demands is through manipulation of the length and diameter ratio of a generator. For a given rotational speed, increasing the diameter of the generator increases the stress levels in the rotating components. Because some electrical generators rotate at relatively high speeds, with potential rotational speeds up to and in excess of 24,000 rpm, the stress levels in rotating components can, upon increasing the generator diameter, reach material limits. Thus, for many vehicles, the increased power demand can only be met by increasing the length of the generator.

As is generally known, some of the electrical components within the generator may generate heat due to electrical losses, and may thus be supplied with a cooling medium. For example, in some generators the main rotor windings and main stator windings are cooled using a cooling medium, such as a lubricant, that flows in and through the generator. In particular, the main rotor and main stator windings are cooled by spraying the cooling medium, via orifices in the main rotor shaft, onto end turns of the main rotor and main stator windings. The cooling medium flow through the main rotor shaft also provides conduction cooling of the main rotor along its axial length. Conduction cooling along the axial length of the main stator is provided via a stator back iron cooling flow path. More specifically, a portion of the cooling medium is directed through a flow path formed in or on the stator back iron.

Although the above described generator cooling configuration provides sufficient cooling for many generators, as the length of the generator is increased the cooling scheme can present certain drawbacks. In particular, the cooling scheme can result in insufficient cooling of the main stator near its axially positioned center, causing a relatively high temperature hot spot at or near this location, which can be detrimental to the stator windings.

Hence, there is a need for a high speed, high power generator that addresses the above-noted drawback. Namely, a high speed, high power generator that supplies sufficient cooling to its main stator windings even if the length to diameter ratio is increased. The present invention addresses at least this need.

BRIEF SUMMARY

The present invention provides a high speed, high power generator that provides enhanced cooling of the main stator near its axially positioned center.

In one embodiment, and by way of example only, a high power generator includes a generator housing, a main rotor, and a main stator. The generator housing has a main stator cooling flow passage formed therein that is configured to receive a flow of a cooling medium. The main rotor is rotationally mounted in the generator housing. The main stator is mounted within the generator housing and surrounds at least a portion of the main rotor. The main stator includes a stator core coupled to the generator housing adjacent the main stator cooling flow passage, and includes two or more nominal-diameter sections and one or more reduced-diameter sections. The nominal-diameter sections each have a first outer diameter, and the reduced-diameter sections, each have a second outer diameter that is less than the first diameter. Each reduced-diameter section is disposed between two nominal-diameter sections and is in fluid communication with the stator cooling flow passage.

In another exemplary embodiment, a stator assembly for a high power generator includes a plurality of stator windings, and a stator core adapted to be coupled to a generator housing and having the plurality of stator windings wound thereon. The stator core includes two or more nominal-diameter sections and one or more reduced-diameter sections. The nominal-diameter sections each have a first outer diameter, and the reduced-diameter sections, each have a second outer diameter that is less than the first diameter. Each reduced-diameter section is disposed between two nominal-diameter sections and is in fluid communication with the stator cooling flow passage.

Other independent features and advantages of the preferred generator and stator assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that for convenience of explanation the present embodiment is depicted and described as being implemented in a brushless AC (alternating current) generator. However, the present invention is not limited to a brushless AC generator environment, but may be implemented in other AC generator designs needed in specific applications.

Figure 1:
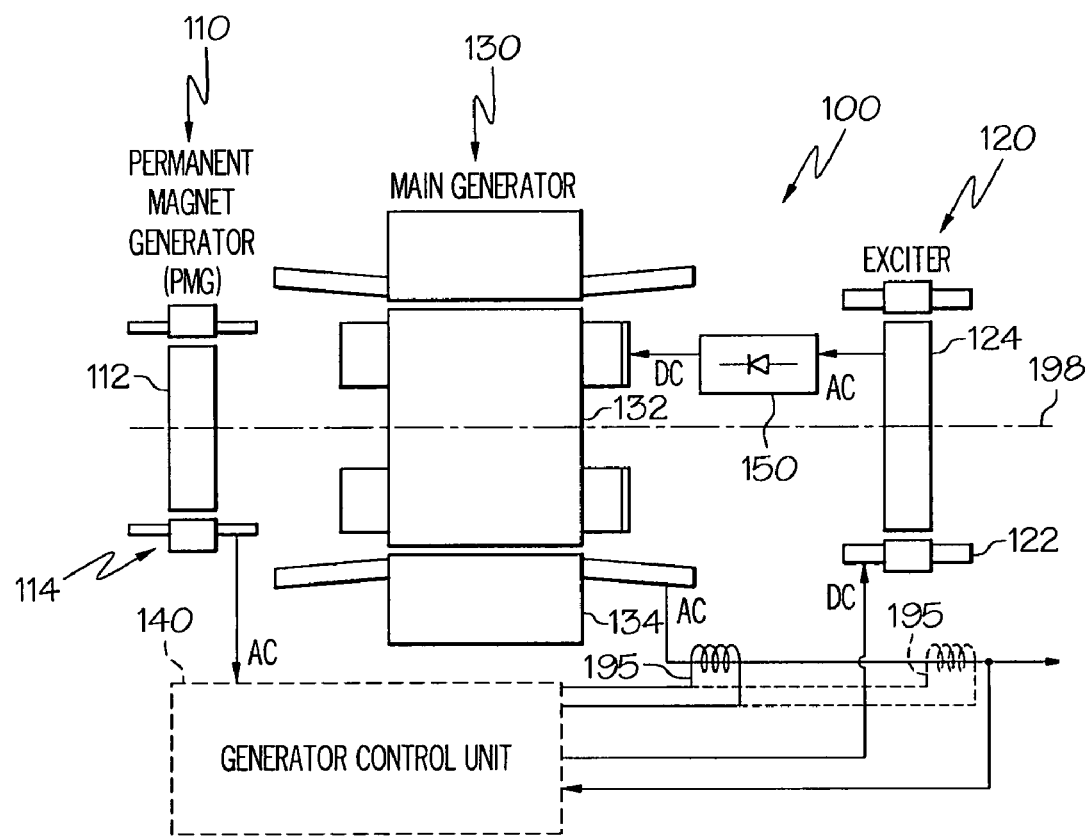
FIG. 1 is a functional schematic diagram of an exemplary high speed generator embodiment.

Turning now to FIG. 1, a functional schematic block diagram of an exemplary high speed generator system 100 for use with a gas turbine engine such as that in an aircraft is depicted. This exemplary generator system 100, which is commonly known as a brushless AC generator, includes a permanent magnet generator (PMG) 110, an exciter 120, a main generator 130, a generator control unit 140, and one or more rectifier assemblies 150. During operation, a rotor 112 of the PMG 110, a rotor 124 of the exciter 120, and a rotor 132 of the main generator 130 all rotate. The rotational speed of these components may vary. In one embodiment, the rotational speed may be, for example, in the range of about 12,000 to about 24,000 r.p.m., or greater. As the PMG rotor 112 rotates, the PMG 110 generates and supplies, via a PMG stator 114, AC power to the generator control unit 140. The generator control unit 140 supplies direct current (DC) power to a stator 122 of the exciter 120. The exciter rotor 124 in turn supplies AC power to the rectifier assemblies 150. The output from the rectifier assemblies 150 is DC power and is supplied to the main rotor 132, which in turn outputs AC power from a main stator 134.

Figure 2:
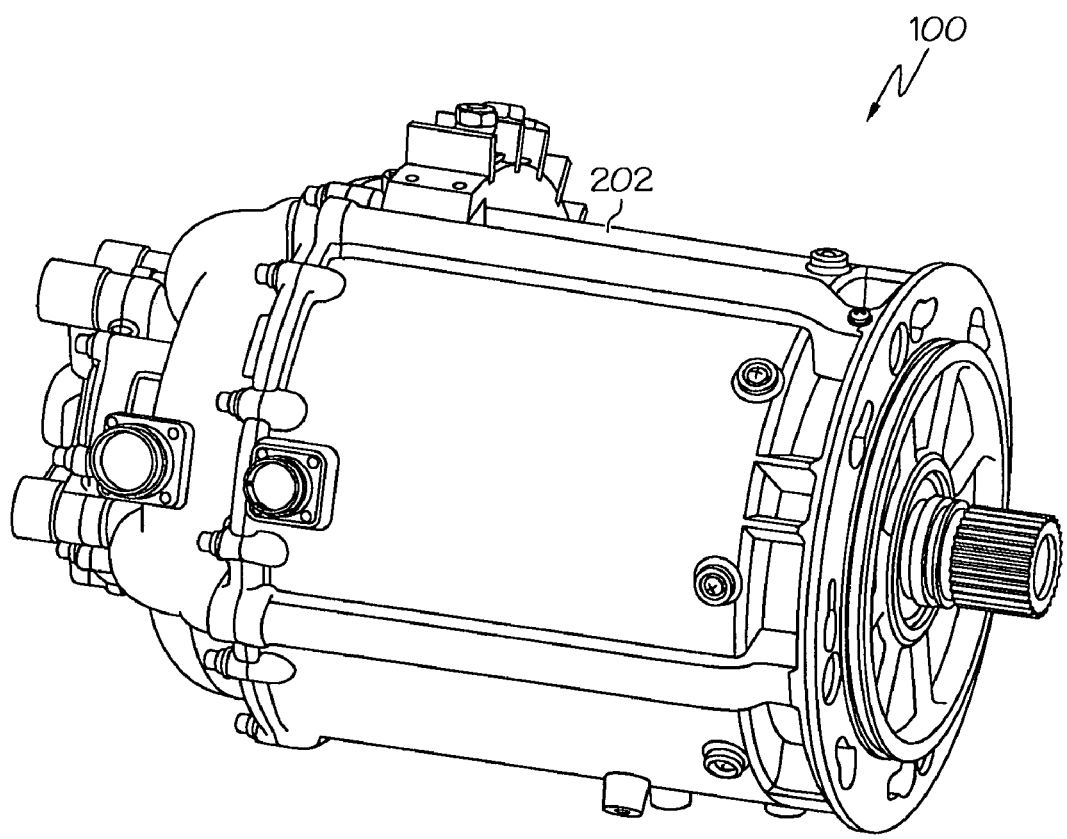
FIG. 2 is a perspective view of a physical embodiment of the generator shown in FIG. 1.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195. In the depicted embodiment, the PMG rotor 112, the exciter rotor 124, and the main rotor 132 are all mounted on a common shaft 136, and thus all rotate along a single axis 198 at the same rotational speed. It will be appreciated, however, that this is merely exemplary of a particular preferred embodiment. It will additionally be appreciated that the generator system 100, or at least portions of the system 100, may be housed within a generator housing 202, a perpsective view of which is illustrated in FIG. 2.

Figure 3:
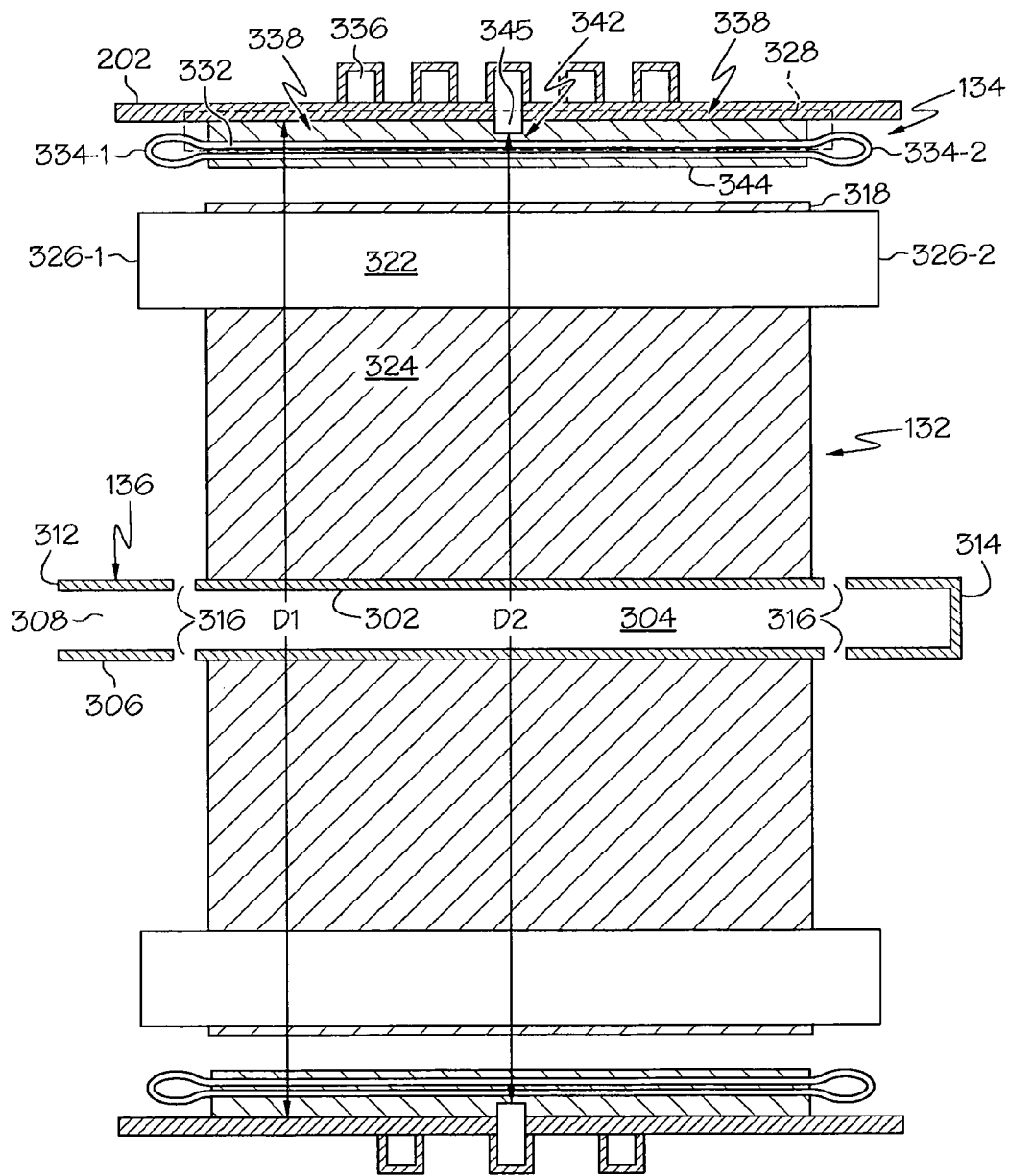
FIG. 3 is a simplified schematic cross section view of the exemplary generator shown in FIGS. 1 and 2 according to an embodiment of the present invention.

Turning now to FIG. 3, which is a simplified cross section side view representative of the schematic and physical high-power generators described above, it is seen that the shaft 136 includes an inner surface 302 that defines an internal fluid flow passage 304, and an outer surface 306. The shaft 136 receives a supply of cooling fluid such as, for example, oil or other lubricant, via an opening 308 in a first end 312 thereof. The supplied cooling fluid flows through the opening 308 and into and through the internal fluid flow passage 304 toward a closed second end 314 of the shaft 136.

As FIG. 3 also depicts, the shaft 136 additionally includes a plurality of end turn cooling supply orifices 316. The end turn cooling supply orifices each extend between the shaft inner 302 and outer 306 surfaces, and are thus in fluid communication with the internal fluid flow passage 304. In the depicted embodiment, the end turn cooling supply orifices 316 are disposed on the shaft 136 near both ends of the main rotor 132. However, it will be appreciated that the end turn cooling supply orifices 216 may be provided near only one end of the main rotor 132.

The main rotor 132, as was noted above, is mounted on the shaft 136, and includes a plurality of poles 318, and a plurality of coils 322 (for clarity, only one shown). The poles 318 extend radially away from the shaft 136 and, as is generally known, are preferably spaced evenly apart from one another. The poles 318 are formed of a plurality of laminations 324, which are shrunk fit onto the shaft 136. The rotor laminations 324, as is generally known, are continuous stacks of a magnetically permeable material. The particular material may be any one of numerous magnetically permeable materials. In a particular preferred embodiment, the laminations 324 are formed of a magnetic alloy material such as, for example, vanadium permendur. It will be appreciated that this material is only exemplary, and that other suitable materials can be used for the main rotor laminations 324.

The rotor coils 322 are wrapped, one each, around a pole 318, and are preferably formed by wrapping numerous individual wire windings around one of the poles 318. In the depicted embodiment, each rotor coil 322 includes two end turns 326 (e.g., 326-1, 326-2), each of which is made up of wire segments that loop around ends of the pole 318. During generator operation cooling fluid supplied to the shaft inner fluid flow passage 304 is directed, via centrifugal force, through the end turn cooling supply orifices 316, and is sprayed onto, among other things, the rotor coil end turns 326. This cooling fluid spray provides cooling to the rotor coil end turns 326 and, as will be described further below, to portions of the main stator 134. It will be appreciated that the cooling fluid flowing through the shaft internal fluid flow passage 304 also provides conduction cooling for the main rotor laminations 324.

The main stator 134 is also mounted within the generator housing 202, and is preferably positioned such that it surrounds the main rotor 132. The main stator 134 includes a stator core 328 and a plurality of stator coils 332, and is coupled to the generator housing 202. More specifically, the main stator 134 is preferably coupled to the generator housing 202 adjacent to a stator cooling flow passage 336 that is formed in the housing 202. The stator cooling flow passage 336 is configured to receive a flow of the cooling medium, which is used to conduction cool the main stator 134. In the depicted embodiment, the stator cooling flow passage 336 is implemented as a spirally configured cavity. It will be appreciated, however, that this is merely exemplary of any one of numerous configurations.

The stator core 328 is configured such that one or more portions thereof have a reduced diameter. In this regard, the stator core 328, at least in the depicted embodiment, includes two nominal-diameter sections 338 and one reduced-diameter section 342. The nominal-diameter sections 338 each have a first outer diameter (D1), and are coupled the generator housing 202. The reduced-diameter section 342 has a second outer diameter (D2) that is less than the first outer diameter, and is disposed between the nominal-diameter sections 338. The reduced-diameter section 342 forms a cavity 345 between the stator core 328 and the generator housing 202 that is in fluid communication with the stator cooling flow passage 336. As such, when cooling medium is supplied to the stator cooling flow passage 336, the cooling medium additionally flows through the cavity 345, preferably in contact with the reduced-diameter section 342. Thus, heat transfer from the main stator 134 is improved. Before proceeding further, it will be appreciated that the stator core 328 could be implemented with more than one reduced-diameter section 342. However, no matter the specific number of reduced diameter sections 342 that are used, it will additionally be appreciated that each is preferably disposed between two nominal-diameter sections 338.

In addition to the above, it will be appreciated that the main stator core 328, similar to the main rotor 132, is preferably formed of a plurality of laminations 344. The main stator core laminations 344, much like the main rotor core laminations 324, are stacks of a magnetically permeable material, which may be any one of numerous magnetically permeable materials such as, for example, silicon iron, or vanadium permendur. However, as may be appreciated from the above paragraph, unlike the main rotor core laminations 324, the main stator core laminations 344 are not all substantially identical. In particular, the main stator core nominal-diameter sections 338 are formed of a stack of nominal-diameter laminations, each having the nominal diameter, and the main stator core reduced-diameter section(s) 342 are formed of a stack of reduced-diameter laminations, each having the reduced diameter.

The stator coils 332 are wrapped around the stator core 328, preferably within non-illustrated slots formed in the stator core 328, and similar to the rotor coils 322 includes a pair of end turns 334 (e.g., 334-1, 334-2). A portion of the cooling fluid spray that is directed onto the rotor coil end turns 326 is also directed onto the stator coil end turns 334, and provides cooling thereto. It will be appreciated that the stator core 328 is additionally cooled via cooling fluid that flows through the stator cooling flow passage 336.

Figure 4:
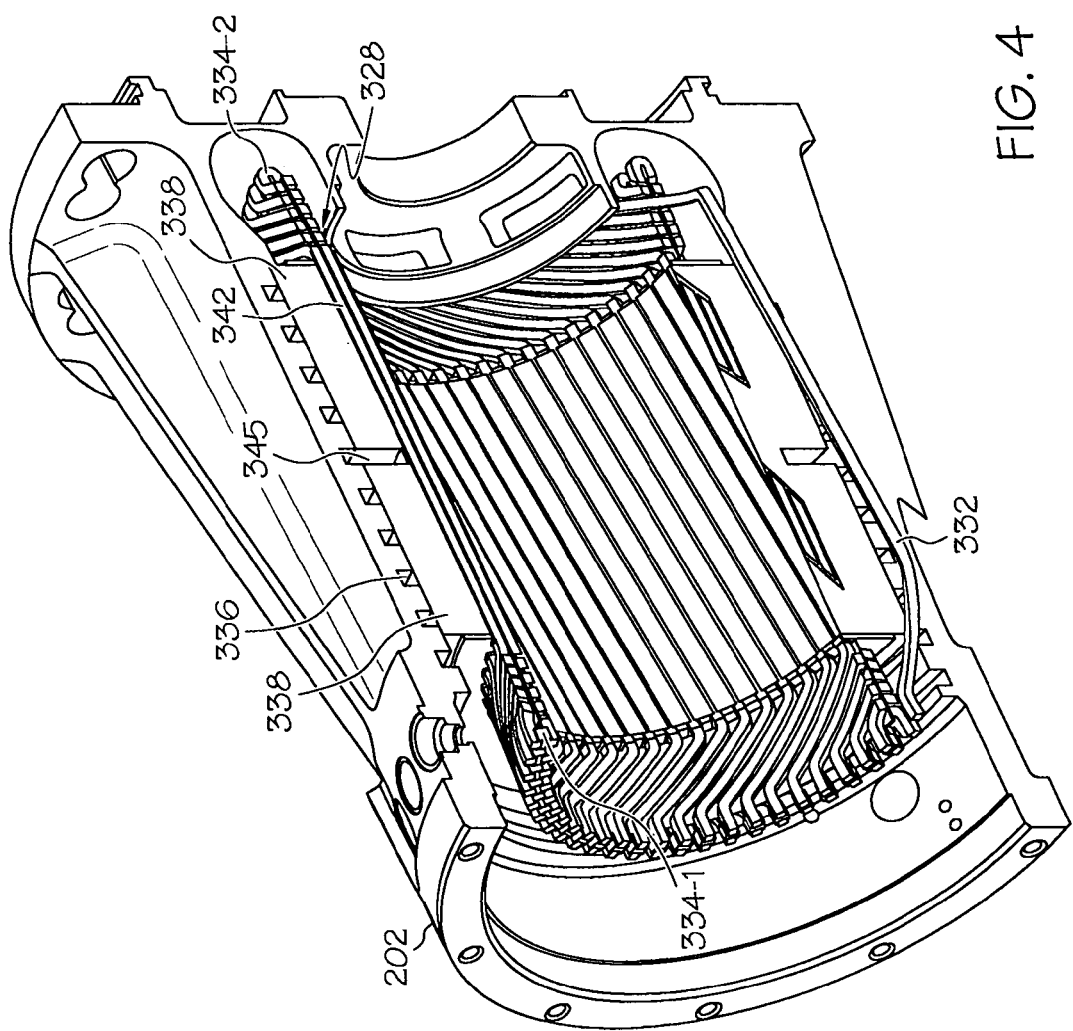
FIG. 4 is a prospective view of the internal components of a physical embodiment of the generator as depicted in the FIG. 3's cross-section view.

FIG. 4 is a prospective view of the internal components of a physical embodiment of the generator as depicted in FIG. 3's cross-section view for the purpose of illustrating and clarifying the current invention.

The high speed, high power generator described herein provides enhanced cooling of the main stator, most notably near its axially positioned center. As such, the axial length of the generator can be increased, if needed to meet increase power generation demands, without adversely impacting thermal management of the generator.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A high power generator, comprising:
    a generator housing having a main stator cooling flow passage formed therein, the main stator cooling flow passage configured to receive a flow of a cooling medium;
    a main rotor rotationally mounted in the generator housing; and
    a main stator mounted within the generator housing and surrounding at least a portion of the main rotor, the main stator including a stator core coupled to the generator housing adjacent the main stator cooling flow passage, the stator core including:
        two or more nominal-diameter sections, each having a first outer diameter, and
        one or more reduced-diameter sections, each having a second outer diameter that is less than the first diameter, each reduced-diameter section (i) disposed between two nominal-diameter sections and (ii) in fluid communication with the stator cooling flow passage; wherein:
    the stator core nominal-diameter sections each comprise a stack of nominal-diameter laminations, each nominal-diameter lamination having the first outer diameter; and
    the stator core reduced-diameter sections each comprise a stack of reduced-diameter laminations, each reduced-diameter lamination having the second outer diameter.

2. The generator of claim 1, further comprising:
    a shaft rotationally mounted within the generator housing and on which the main rotor is mounted, the shaft including an inner surface that defines an internal fluid flow passage, an outer surface, and a plurality of end turn cooling supply orifices extending between the shaft inner and outer surfaces, the internal fluid flow passage configured to receive a flow of the cooling medium, and each end turn cooling supply orifice in fluid communication with the internal fluid flow passage.

3. The generator of claim 2, wherein:
    the main stator further includes a plurality of main stator windings wound on the stator core, each stator winding having at least one end turn; and
    the end turn cooling supply orifices are configured such that cooling medium supplied to the internal fluid flow passage flows through at least selected ones of the end turn cooling supply orifices and is directed toward the stator winding end turns.

4. The generator of claim 3, wherein the stator core is configured such that the cooling medium in the stator cooling flow passage does not contact any of the stator windings.

5. The generator of claim 3, wherein:
    the main rotor includes a plurality of rotor poles that extend radially therefrom;
    the main rotor further includes a plurality of rotor windings wound on the rotor poles, each of the rotor windings having at least one end turn; and
    the end turn cooling supply orifices are configured such that cooling medium supplied to the internal fluid flow passage flows through at least selected ones of the end turn cooling supply orifices and is directed toward the rotor winding end turns.

6. The generator of claim 2, further comprising:
    an exciter rotor mounted on the shaft; and
    a permanent magnet generator rotor mounted the shaft.

7. The generator of claim 6, further comprising:
    an exciter stator mounted within the generator housing and surrounding at least a portion of the exciter rotor; and
    a permanent magnet generator stator mounted within the generator housing and surrounding at least a portion of the permanent magnet generator rotor.

8. A generator, comprising:
    a generator housing having a main stator cooling flow passage formed therein, the main stator cooling flow passage configured to receive a flow of a cooling medium;
    a shaft rotationally mounted within the generator housing and including an inner surface that defines an internal fluid flow passage, an outer surface, and a plurality of end turn cooling supply orifices extending between the shaft inner and outer surfaces, the internal fluid flow passage configured to receive a flow of the cooling medium, and each end turn cooling supply orifice in fluid communication with the internal fluid flow passage;

a main rotor mounted in the generator housing on the shaft; and a main stator mounted within the generator housing and surrounding at least a portion of the main rotor, the main stator including a stator core coupled to the generator housing adjacent the main stator cooling flow passage, the stator core including:

two or more nominal-diameter sections, each having a first outer diameter, and one or more re reduced-diameter sections, each having a second outer diameter that is less than the first diameter, each reduced-diameter section (i) disposed between two nominal-diameter sections and (ii) in fluid communication with the stator cooling flow passage.

9. The generator of claim 8, wherein:

the main stator further includes a plurality of main stator windings wound on the stator core, each stator winding having at least one end turn; and the end turn cooling supply orifices are configured such that cooling medium supplied to the internal fluid flow passage flows through at least selected ones of the end turn cooling supply orifices and is directed toward the stator winding end turns.

10. The generator of claim 9, wherein the stator core is configured such that the cooling medium in the stator cooling flow passage does not contact any of the stator windings.

11. The generator of claim 8, wherein:

the main rotor includes a plurality of rotor poles that extend radially there from;

the main rotor further includes a plurality of rotor windings wound on the rotor poles, each of the rotor windings having at least one end turn; and the end turn cooling supply orifices are configured such that cooling medium supplied to the internal fluid flow passage flows through at least selected ones of the end turn cooling supply orifices and is directed toward the rotor winding end turns.

12. The generator of claim 8, wherein:

the stator core nominal-diameter sections each comprise a stack of nominal-diameter laminations, each nominal-diameter lamination having the first outer diameter; and the stator core reduced-diameter sections each comprise a stack of reduced-diameter laminations, each reduced-diameter lamination having the second outer diameter.

13. The generator of claim 8, further comprising:

an exciter rotor mounted on the shaft; and a permanent magnet generator rotor mounted the shaft.

14. The generator of claim 13, further comprising:

an exciter stator mounted within the generator housing and surrounding at least a portion of the exciter rotor; and a permanent magnet generator stator mounted within the generator housing and surrounding at least a portion of the permanent magnet generator rotor.

15. A stator assembly, comprising:

a plurality of stator windings;

a stator core adapted to be coupled to a generator housing, the stator core having the plurality of stator windings wound thereon and including:

two or more nominal-diameter sections, each having a first outer diameter, and one or more reduced-diameter sections, each having a second outer diameter that is less than the first diameter, each reduced-diameter section (i) disposed between two nominal-diameter sections and (ii) in fluid communication with a stator cooling flow passage;

wherein:

the stator core nominal-diameter sections each comprise a stack of nominal-diameter laminations, each nominal-diameter lamination having the first outer diameter;

the stator core reduced-diameter sections each comprise a stack of reduced-diameter laminations, each reduced-diameter lamination having the second outer diameter.

* * * * *